H. A. GOODMAN.
Car Brake.
No. 106,052. Patented Aug. 2, 1870.
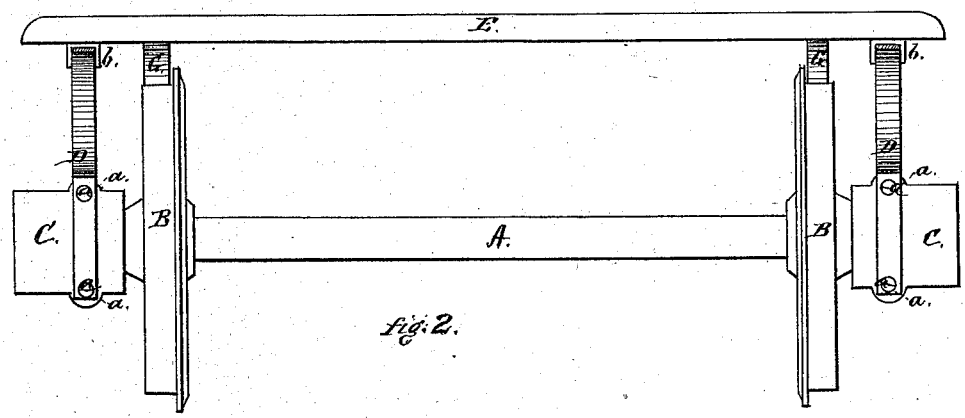
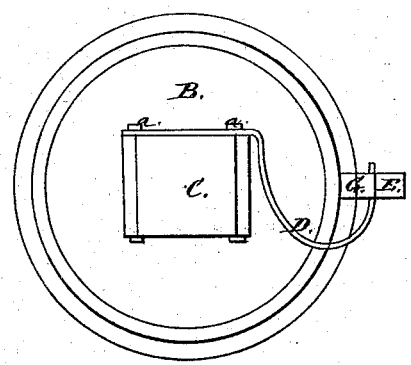

United States Patent Office.

HENRY A. GOODMAN, OF OMAHA, NEBRASKA, ASSIGNOR TO HIMSELF AND ERNEST VON JEINSEN, OF SAME PLACE.

Letters Patent No. 106,052, dated August 2, 1870.

IMPROVEMENT IN CAR-BRAKES.

The Schedule referred to in these Letters Patent and making part of the same.

*To all whom it may concern:*

Be it known that I, HENRY A. GOODMAN, of Omaha, in the county of Douglas and in the State of Nebraska, have invented certain new and useful Improvements in Car-Brakes; and do hereby declare that the following is a full, clear, and exact description thereof, reference being had to the accompanying drawing and to the letters of reference marked thereon making a part of this specification.

The nature of my invention consists in the construction and arrangement of a "car-brake," as will be hereinafter fully set forth.

In order to enable others skilled in the art to which my invention appertains to make and use the same, I will now proceed to describe its construction and operation, referring to the annexed drawing, in which—

Figure 1 is a plan view, and
Figure 2 is a side view of my car-brake.

A represents the axle, upon which are the wheels B B, and outside of the wheels the journal-boxes C C, attached to the iron frame of the truck by means of bolts, *a a*.

These bolts also secure a spring, D, on top of the journal-box C, said springs being bent, as shown in fig. 2, their outer ends bearing against the brake-beam E, within guides *b b*.

To the brake-beam E the brake-blocks G G are attached in any suitable manner.

The guides *b b* keep the brake-beam always in its place, and the springs D D keep the brake-blocks or shoes always free of the wheels, except when the brake is needed on the wheel.

The springs D D may be secured on the under side of the journal-boxes, as well as on top, with the same bolts that secure the boxes to the frame.

The advantages of attaching the springs outside of the wheels on the journal-boxes are—

First, that, in trucks as sometimes constructed, it does away with two wood bars that have to be put on the truck to attach the springs to, and twelve bolts that are required to connect the bars and springs together, when the springs are inside of the wheels.

Second, in case it is desired to detach the spring from the truck for repairs, it is only necessary to take off two nuts, and the work is accomplished, while, in the other case, if the spring-bar breaks, it is necessary to jack up the car, and run out the truck, in order to get at the bolts, for it is generally the wooden bar that breaks.

Third, by putting the spring on the outside, it brings the power of springs nearer the ends of the brake-beam when the brake is being set up to the wheels, keeping the beam and brakes more even and steady.

Having thus fully described my invention,
What I claim as new, and desire to secure by Letters Patent, is—

The springs D D, when attached, on the outside of the car-wheels, to the journal-box, substantially as and for the purposes herein set forth.

In testimony that I claim the foregoing, I have hereunto set my hand this 4th day of May, 1870.

HENRY A. GOODMAN.

Witnesses:
J. S. SPAUN,
R. L. DANIELS.